April 24, 1951  D. T. BRADLEY  2,549,768

VIBRATION MOUNTING

Filed Dec. 8, 1945

INVENTOR.
DAN T. BRADLEY
BY
Kurs Hudson Boughton & Williams
ATTORNEYS

Patented Apr. 24, 1951

2,549,768

UNITED STATES PATENT OFFICE 2,549,768

VIBRATION MOUNTING

Dan T. Bradley, Shaker Heights, Ohio, assignor, by mesne assignments, to Harris Products Company, Cleveland, Ohio, a corporation of Ohio Application December 8, 1945, Serial No. 633,597

7 Claims. (Cl. 248—358)

This invention relates to vibration absorbing devices for mounting instruments, radio apparatus and various other devices and equipment, and, as one of its objects, aims to provide an improved and simplified vibration absorbing device of this kind.

Another object of the invention is to provide an improved vibration absorbing device of this character, having a resiliently yieldable portion in the form of a cantilever member made of rubber or rubber-like material.

A further object of the present invention is to provide an improved vibration absorbing device of this character, in which the cantilever member is flexible in a plurality of different directions and may have different degrees of flexibility for such different directions.

Still another object of the present invention is to provide an improved vibration absorbing device in the form of a simple bracket adapted to be economically manufactured and installed and in which a resilient arm forming the cantilever member projects from the attaching portion or base at any desired angle and has means adjacent its outer end for connection with the load or object to be supported.

A further object is to provide an improved vibration absorbing device of the character mentioned, in which novel stop means is employed for controlling the extent and rate of deflection of the resilient load-carrying arm.

It is also an object of this invention to provide a vibration absorbing means of such character that a plurality of these resilient cantilever members or bracket devices may be employed and disposed so that the load or object will be supported thereby or suspended between the cantilever members or bracket devices and substantially in the plane of the center of mass.

The invention can be further briefly summarized as consisting in certain novel combinations and arrangements of parts hereinafter described and particularly set out in the appended claims.

In the accompanying sheet of drawings.

Figure 1:
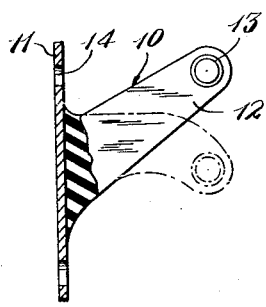
Fig. 1 is a side elevation showing one form of the vibration absorbing device of the present invention.
Figure 2:
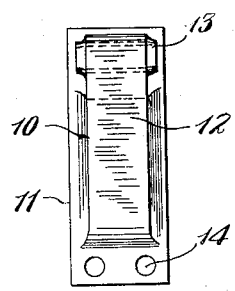
Fig. 2 is an end elevation of the device.

In the embodiment of the invention illustrated in Figs. 1 and 2 the improved vibration absorbing device 10 is shown as comprising an attaching portion or base 11 and a resilient arm or cantilever member 12 connected to such base and projecting outwardly therefrom. The arm 12 is provided adjacent its outer end with an opening or sleeve 13 extending therethrough and intended to be used for connecting therewith the load or device to be supported.

The base 11 is here shown as comprising a substantially flat metal plate having openings 14 therethrough which accommodate screws or other fastening members by which the base can be connected with an available support. The base 11 can be of any appropriate size and shape and is here shown as being rectangular in form.

The resilient arm 12 is preferably made of rubber or rubber-like material and for this purpose either natural or synthetic rubber can be used, the material preferably being a soft vulcanized rubber of the required composition and stiffness so that the arm will have predetermined rate of deflection and load-carrying characteristics. The resilient arm 12 may be of any desired cross-sectional shape and has a length and cross-sectional area which are appropriate for the load to be carried and the space available to accommodate the vibration absorbing device. In this instance the arm 12 is shown as having a substantially square cross-sectional shape and as having a somewhat converging taper in a direction away from the base 11.

Figure 8:
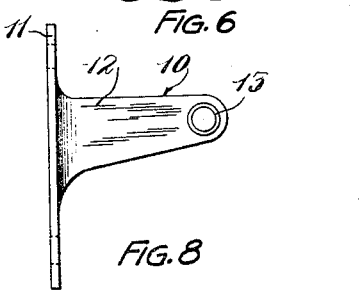
Fig. 8 is side elevation showing another form of the invention.
Figure 9:
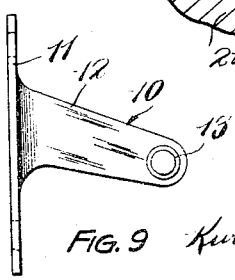
Fig. 9 is a similar view of still another form.

It is an important characteristic of the vibration absorbing device 10 that the resilient arm 12 constitutes a cantilever member which projects outwardly from the base 11 and is adapted to receive the applied load at or adjacent its free outer end. In the embodiment of the invention illustrated in Fig. 1 the resilient arm 12 extends upwardly as well as laterally from the base 11 in its free or unloaded condition so that when a predetermined static load is applied the arm will be deflected downwardly to a fully loaded position extending substantially horizontally or at right angles to the base 11 as indicated in broken lines in Fig. 1. However, the arm 12 may, in its unloaded state, project horizontally, or downwardly, as shown in Figs. 8 and 9, respectively, the exact arrangement of the arm being determined by the load, deflection and vibration-absorbing requirements of the particular application.

The resilient arm 12, while in its loaded or deflected condition, is flexible in a plurality of different directions relative to the base 11 for absorbing the shocks and vibrations which would otherwise be transmitted from the base 11 to the device being supported, or vice versa. Assuming that the arm is in its loaded or broken line position of Fig. 1 it will be seen that vibratory movements of the load upwardly and downwardly in a substantially vertical direction will cause corresponding flexings or movements of the arm upwardly and downwardly from the broken line position. Movements of the load in a lateral direction, that is, crosswise of the base 11 in a substantially horizontal plane will cause corresponding sidewise flexings or movements of the arm. Likewise, movements of the load in a substantially horizontal plane toward and from the base 11 will cause deflection of the arm toward or away from the base but the resistance to deflection will be much greater because of the endwise compression of the arm. These flexings of the resilient arm 12 in one or more of the directions just mentioned by the applied forces enable the arm to absorb and cushion various shocks and vibrations which would otherwise be transmitted to or from the device being supported.

The above-mentioned outwardly converging taper for the cantilever arm is also an important characteristic because it gives the arm a progressively varying cross-section which causes a progressively increasing resistance build-up in the arm when a shock load is applied to its outer end such that the greater the deflection produced by the shock load, the greater will be the resistance build-up. It therefore follows that the tapered characteristic gives the arm the ability to resist deflection from shock loads with a resistance value which increases substantially in proportion to the magnitude of such shock loads.

From the foregoing it will be seen that the cross-section, length and relative inclination of the resilient arm 12 can be selected so that the rate of deflection of the arm in the three directions mentioned above will meet the requirements of the application. This is an important advantage because for certain kinds of service where the installation is subject to shock forces in certain directions, as well as to vibrations, it is desirable that the resilient arm have the required resistance to flexing in the direction necessary to counteract these shock forces. For example, a piece of apparatus mounted on a railway car is subject to more severe shocks longitudinally of the car than it is in either a vertical or transverse direction due to the effects of coupling cars together and jerks caused by the locomotive or the action of the brakes. Thus in Fig. 3, if the side elevation be assumed to be longitudinally of the car, it is obvious that the severe shocks referred to would subject the arms 12 to longitudinal compression and thereby absorb the shocks. The arching of the arms 12 would have the effect of increasing their flexibility in compression thus enhancing their cushioning action.

In the vibration absorbing device 10 which is illustrated in Figs. 1 and 2, the inner or fixed end of the resilient arm 12 is attached to the base 11 by being bonded or vulcanized thereto so that the arm and base together constitute a simple self-contained bracket which can be economically manufactured and easily installed. It is not necessary, however, that the resilient arm 12 be connected with a base in the form of a plate as here shown, and for certain uses of the device, the plate 11 could be an integral part of the arm.

The sleeve 13 provided in the outer end of the resilient arm 12 for use in mounting the load thereon, can be made of metal or suitable other material such as a rubberized friction fabric. This sleeve extends through the arm and is bonded or vulcanized in place therein and is preferably of a length to project somewhat beyond the side faces of the arm.

Figure 5:
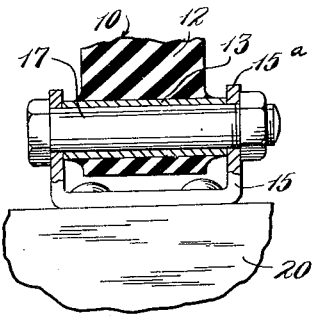
Fig. 5 is a partial sectional plan view taken on line 5—5 of Fig. 3 and showing one way of connecting the load to the resilient arm of the device.

The load or object 20 to be supported can be connected to the outer end of the arm 12 by any suitable connecting means and, for this purpose, I have shown in Fig. 5 an attaching clip or bracket 15 connected with the load and having spaced arms 15a disposed against or adjacent the ends of the sleeve 13. The clip 15 can be connected with the resilient arm 12 by means of a bolt or pin 17 extending through the spaced arms 15a and the opening of the sleeve 13. When the load 20 is connected with the resilient arm 12 in this manner it will be seen that the pin 17 may act in the nature of a pivot pin and will have small turning movements in the sleeve 13 during the upward and downward movements of the load.

Figure 6:
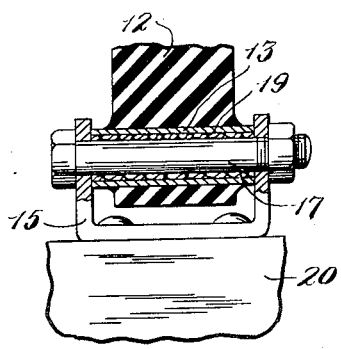
Fig. 6 is a sectional view similar to Fig. 5 but showing an alternate form of load connection.

Instead of having the connecting pin 17 turn freely in the sleeve 13 of the resilient arm it may be desirable to retard or suppress such pivotal movements so as to obtain an additional vibration absorbing or dampening function. This can be accomplished by the construction illustrated in Fig. 6 in which a friction lining 19 is provided between the wall of the sleeve 13 and the connecting pin 17. The lining 19 can be suitable friction fabric or can be a lining of soft rubber bonded or vulcanized to the inner wall of the sleeve 13.

Figure 3:
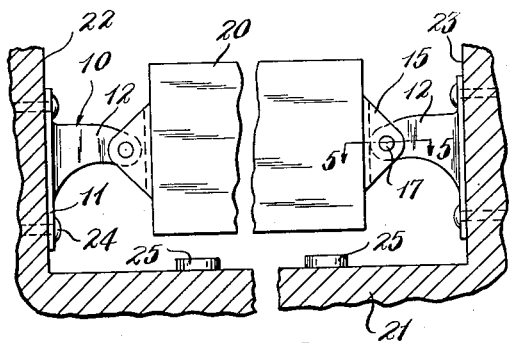
Fig. 3 is an elevational view showing an installation utilizing a plurality of the improved vibration absorbing devices.
Figure 4:
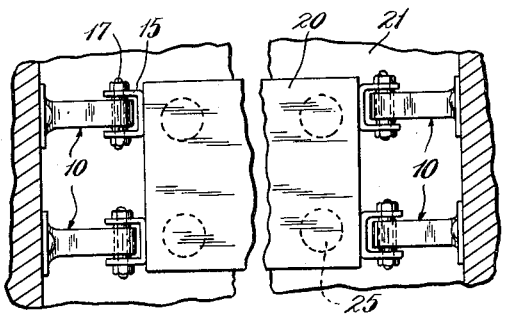
Fig. 4 is a plan view of the same installation.

In Figs. 3 and 4 of the drawings I have shown a vibration mounting arrangement in which the load 20, such as a radio apparatus on a railway car, is supported by a plurality of the vibration absorbing devices 10 disposed substantially in the plane of the center of gravity of the load with their resilient arms extending longitudinally of the car. In this instance the support 21, on which the load 20 is to be mounted, has longitudinally spaced upright mounting portions 22 and 23 thereon and between which the load is located. The vibration absorbing devices 10 are located between the ends of the load 20 and the upright supporting portions 22 and 23 so that the load will be suspended between a pair, or plurality of pairs, of these vibration absorbing devices. As shown in Figs. 3 and 4 the vibration absorbing devices 10 have their bases 11 connected with the upright portions 22 and 23 of the support 21 by suitable bolts or fasteners 24 and have the outer ends of their resilient arms 12 connected with the load 20 by the above described connecting clips 15 and pivot pins 17.

When the load 20 has been mounted in this manner on a plurality of the vibration absorbing devices 10, it will be suspended between the devices as mentioned above and the resilient arms 12 will be deflected downwardly to a substantially horizontal loaded position and thereafter relative up and down movements between the load 20 and the support 21 will cause corresponding flexings of the resilient arms in an upward and downward direction. Movements of the load 20 in a lateral direction transversely of the resilient arms 12 will cause corresponding lateral flexings of these arms. Similarly, movements of the load in a longitudinal direction, that is, toward and from the upright portions 22 and 23 of the support will cause the resilient arms 12 to be flexed toward and away from these upright supporting portions. During these flexings of the resilient arms 12 they act in the manner of cantilever members and the resilient arms will therefore effectively absorb vibrations and shocks which would otherwise be transmitted between the load and the supports. Moreover, when the arms 12 have been deflected by the static load 20 to the substantially horizontal position mentioned above and endwise vibratory movements or shocks occur in either direction, the force of such vibratory movements or shocks will be absorbed by causing the rubber-like material of the arm or arms located at one end of the static load to be subjected to compression. This is an advantage because rubber and rubber-like materials are strong and durable when being used in compression for cushioning purposes. If desired, suitable resilient bumpers 25 can be provided on the support 21 at one or more points beneath the load 20 to take care of abnormal deflections.

Figure 7:
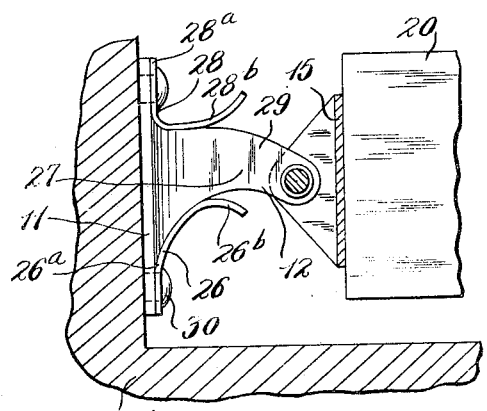
Fig. 7 is a partial elevational view showing an installation similar to Fig. 3 but in which a modified form of vibration absorbing device is employed.

Fig. 7 of the drawings shows a modified construction in which stop means is provided for controlling the extent and rate of deflection of the resilient arm 12. In this modified construction a substantially rigid stop member 26, made of metal plate or other suitable material, is provided for this purpose and is located so as to cooperate with the lower face 27 of the arm and another such stop member 28 is located so as to cooperate with the upper face 29 of the arm. Although the arm 12 can have any desired cross-sectional shape as mentioned above, its lower and upper longitudinal faces 27 and 29 are preferably flat, as shown in the drawing, so as to provide for a relatively large area of contact with the stop members 26 and 28. The lower stop 26 has its inner end 26a fixed to or held against the base 11 as by means of the mounting screws 30 and has an outwardly and downwardly extending longitudinally curved substantially flat portion 26b adapted to be engaged by the flat lower face 27 of the resilient arm 12. The upper stop 28 has its inner end 28a similarly connected to the base 11 and has an outwardly and upwardly extending longitudinally curved substantially flat portion 28b adapted to be engaged by the flat upper face 29 of the resilient arm. During downward flexing of the arm 12 the face 27 engages progressively increasing portions of the stop 26 and thus produces an increase in the rate of resistance to downward deflection of the arm. The curved portion 28b of the upper stop 28 serves in a similar manner to increase the effective resistance of the arm 12 to deflection in an upward direction.

The stops 26 and 28 just described above are preferably employed in pairs with such stops located below and above the arm 12 as shown in Fig. 7 although, if desired, either the upper or the lower stop could be omitted depending upon the flexing characteristics desired in the resilient arm. Likewise, it should be understood that although the stops 26 and 28 are here shown located below and above the resilient arm they can be located adjacent the side faces of the arm so as to control the rate of the lateral flexings instead of, or in addition to, controlling the flexings in a vertical direction. Additionally, it should be understood that the flexible arms of the mounting illustrated in Figs. 3 and 7 can embody either the plain pivotal connection of Fig. 5 or the frictional pivotal connection of Fig. 6.

From the foregoing description and the accompanying drawing it will now be readily understood that this invention provides an improved vibration absorbing device which can be economically manufactured and installed and which embodies a resilient arm adapted to function as a cantilever member in supporting an applied load. It will also be seen that the improved device can be constructed in the form of a simple bracket and that the stresses produced in the resilient arm by the applied load will be so distributed that the flexibility of the rubber or rubber-like material will be utilized to maximum advantage. It will also be seen that the novel stop means herein disclosed provides for controlling the rate and extent of flexibility in the improved vibration absorbing device.

Although the vibration absorbing devices of the present invention have been disclosed herein in considerable detail, it will be understood, of course, that the invention is, nevertheless, intended to include all changes and modifications coming within the scope of the appended claims.

Having thus described my invention, I claim:

1. A vibration dampener in the form of a bracket comprising a substantially rigid base adapted to be connected with a support, a tapered resilient arm of rubber-like material connected with and projecting from the base and having a cross-section decreasing gradually in a direction outwardly from said base, the taper of said arm imparting thereto a resistance to deflection from shock loads applied to its outer end and which resistance increases substantially in proportion to the magnitude of such shock loads.

2. A vibration dampener in the form of a bracket comprising a substantially rigid base adapted to be connected with a support, a tapered resilient arm of rubber-like material connected with and projecting from the base and having a cross-section decreasing gradually in a direction outwardly from said base, said arm having an opening therein adjacent its outer end, a pin extending through said opening for attaching a load to said arm, and friction means in said opening and engaging said pin.

3. A vibration dampener comprising a resilient cantilever arm of rubber-like material having a base at its inner end adapted for fixed connection with a support and also having transverse pivot means extending through its outer end for the pivotal mounting thereon of a predetermined load to be supported, said arm being tapered and having a decreasing cross-section in a direction away from said base and toward said outer end such that under said predetermined load the arm assumes an arched condition in which it has relatively increased resistance to deflection from shocks applied to the arm substantially endwise thereof.

4. A vibration dampener comprising a base adapted for connection with a support, and a resilient cantilever arm of rubber-like material connected to said base and extending in inclined relation thereto and provided with means spaced from said base for attachment of a predetermined load to be supported, said arm being tapered and having a decreasing cross-section in a direction away from said base such that under said predetermined load the arm assumes an arched condition extending substantially at right angles to said base and in which condition it has increased resistance to deflection from shocks applied to the arm substantially endwise thereof.

5. A vibration dampener comprising a substantially rigid base adapted to be fixedly connected with a support, a resilient cantilever arm of rubber-like material having large and small inner and outer ends and an outwardly decreasing longitudinal taper and having its inner end connected to said base so that the arm projects outwardly therefrom in an inclined relation, the taper and inclination of said arm imparting thereto a resistance to deflection from shock loads applied to its outer end and which resistance increases substantially in proportion to the magnitude of such shock loads, and pivot means carried by said outer end for pivotally connecting a load to be supported with said outer end.

6. A vibration dampener comprising a substantially rigid base adapted to be connected with a support, a tapered resilient arm of rubber-like material connected with and projecting from said base and having a cross-section decreasing gradually in a direction outwardly from said base, the taper of said arm imparting thereto a resistance to deflection from shock loads applied to its outer end and which resistance increases substantially in proportion to the magnitude of such shock loads, and a stop extending along a portion of said arm and adapted to be engaged progressively therealong by said arm upon predetermined flexing of the latter in a direction toward the stop.

7. A vibration dampener comprising a resilient arm of rubber-like material having inner and outer large and small ends and an outwardly decreasing longitudinal taper between said ends, connecting means on said arm at the large end thereof for fixedly connecting said large end with a support for mounting said arm on said support in outwardly projecting relation thereto, and pivot means carried by the small outer end for pivotally connecting a load to be supported with said outer end.

DAN T. BRADLEY.

REFERENCES CITED

The following references are of record in the file of this patent:

UNITED STATES PATENTS

| Number | Name | Date |
|---|---|---|
| 1,929,201 | Frohlich et al. | Oct. 3, 1933 |
| 2,260,022 | Gwinn | Oct. 21, 1941 |
| 2,440,670 | Kaemmerling | Apr. 7, 1948 |
| 2,442,754 | Beam | June 8, 1948 |

FOREIGN PATENTS

| Number | Country | Date |
|---|---|---|
| 482,511 | Great Britain | Sept. 28, 1936 |